(12) United States Patent
Watanabe

(10) Patent No.: US 11,987,702 B2
(45) Date of Patent: May 21, 2024

(54) THERMOPLASTIC RESIN COMPOSITION COMPRISING A CORE-SHELL RESIN AND A MOLDED RESIN ARTICLE COMPOSED OF THE THERMOPLASTIC RESIN COMPOSITION

(71) Applicant: Nissin Chemical Industry Co., Ltd., Echizen (JP)

(72) Inventor: Kentaro Watanabe, Echizen (JP)

(73) Assignee: NISSIN CHEMICAL INDUSTRY CO., LTD., Echizen (JP)

(*) Notice: Subject to any disclaimer, the term of this patent is extended or adjusted under 35 U.S.C. 154(b) by 31 days.

(21) Appl. No.: 17/070,251

(22) Filed: Oct. 14, 2020

(65) Prior Publication Data

US 2021/0108081 A1 Apr. 15, 2021

(30) Foreign Application Priority Data

Oct. 15, 2019 (JP) .................. 2019-188781
Oct. 5, 2020 (JP) .................. 2020-168360

(51) Int. Cl.
| | | |
|---|---|---|
| C08L 51/08 | (2006.01) | |
| B29C 45/00 | (2006.01) | |
| C08F 283/12 | (2006.01) | |
| C08L 27/06 | (2006.01) | |
| C08L 33/08 | (2006.01) | |
| C08L 33/12 | (2006.01) | |
| C08L 55/02 | (2006.01) | |
| C08L 67/00 | (2006.01) | |
| C08L 69/00 | (2006.01) | |
| C08L 75/04 | (2006.01) | |
| C08L 75/06 | (2006.01) | |
| C08L 77/00 | (2006.01) | |
| C08L 83/04 | (2006.01) | |
| B29K 33/00 | (2006.01) | |
| B29K 83/00 | (2006.01) | |

(52) U.S. Cl.
CPC .......... *C08L 83/04* (2013.01); *B29C 45/0001* (2013.01); *C08F 283/12* (2013.01); *C08F 283/122* (2013.01); *C08L 27/06* (2013.01); *C08L 33/08* (2013.01); *C08L 33/12* (2013.01); *C08L 55/02* (2013.01); *C08L 67/00* (2013.01); *C08L 69/00* (2013.01); *C08L 75/04* (2013.01); *C08L 75/06* (2013.01); *C08L 77/00* (2013.01); *B29K 2033/12* (2013.01); *B29K 2083/00* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 5,223,586 | A | * | 6/1993 | Mautner ............. C08F 283/124 525/902 |
| 5,306,772 | A | | 4/1994 | Mimura et al. |
| 2004/0024121 | A1 | * | 2/2004 | Schultes ................. C08L 33/12 525/63 |
| 2010/0086783 | A1 | * | 4/2010 | Schaefer ............... C08F 283/12 428/407 |

FOREIGN PATENT DOCUMENTS

| | | | |
|---|---|---|---|
| EP | 492376 | * | 12/1991 |
| JP | 64-18408 A | | 1/1989 |
| JP | 1-204950 A | | 8/1989 |
| JP | 1-214475 A | | 8/1989 |
| JP | 3-281556 A | | 12/1991 |
| JP | 4-173869 A | | 6/1992 |
| JP | 4-234450 A | | 8/1992 |
| JP | 4-264152 A | | 9/1992 |
| JP | 6-100746 A | | 4/1994 |
| JP | 7-102186 A | | 4/1995 |
| JP | 7-39214 B2 | | 5/1995 |
| JP | 9-136929 A | | 5/1997 |
| JP | 2903432 | * | 6/1999 |
| JP | 2000290397 | * | 10/2000 |

OTHER PUBLICATIONS

Colas; Silicone Biomaterials: History and Chemistry; (2005) pp. 80-86. (Year: 2005).*
English translation of the Chinese Office Action and Search Report for Chinese Application No. 202011102844.9, dated Jul. 1, 2023.

* cited by examiner

*Primary Examiner* — David J Buttner
(74) *Attorney, Agent, or Firm* — Birch, Stewart, Kolasch & Birch, LLP

(57) ABSTRACT

A thermoplastic resin composition comprising 80 to 99.9 parts by mass of a thermoplastic resin (I), and 0.1 to 20 parts by mass of a silicone-acryl core-shell resin (II), a total mass of the thermoplastic resin (I) and the silicone-acryl core-shell resin (II) being 100 parts by mass, wherein a core particle of the silicone-acryl core-shell resin (II) is composed of an organopolysiloxane (A), and a shell layer of the silicone-acryl core-shell resin (II) is composed of a poly (meth) acrylate ester (B), a mass ratio of the organopolysiloxane (A) to the poly (meth) acrylate ester (B) is in a range of 40:60 to 90:10, and a length ($\beta$) of the part of a circumference occupied by the poly (meth) acrylate ester in the silicone-acryl core-shell resin (II) accounts for at least 90% of a whole circumferential length ($\alpha$) of the silicone-acryl core-shell resin (II).

6 Claims, 1 Drawing Sheet

THERMOPLASTIC RESIN COMPOSITION COMPRISING A CORE-SHELL RESIN AND A MOLDED RESIN ARTICLE COMPOSED OF THE THERMOPLASTIC RESIN COMPOSITION

CROSS REFERENCE

This application claims the benefits of Japanese Patent application Nos. 2019-188781 filed on Oct. 15, 2019 and 2020-168360 filed on Oct. 5, 2020, the contents of which are hereby incorporated by reference.

FIELD OF THE INVENTION

The present invention relates to a thermoplastic resin composition comprising a silicone-acryl core-shell resin and a molded article composed of the thermoplastic resin composition. More specifically, the molded article has an excellent friction property and releasability, while retaining the properties of the thermoplastic resin.

BACKGROUND OF THE INVENTION

Thermoplastic resins such as polystyrene, polymethyl methacrylate, polypropylene, polyethylene, polyvinyl chloride, polyacetal, polyurethane, polyester, ABS, and AS are excellent in moldability, processability, transparency, and colorability, and are less expensive. Accordingly, these resins are conventionally used in a large amount as a general-purpose resin to prepare various molded articles, such as films and sheets. However, when processed into a film or a sheet, the soft resin such as polyethylene, polyvinyl chloride, or polypropylene tends to cause blocking, so that an abnormal sound such as crunching sound occurs when a rolled film or sheet is unwound. Tackiness between sheets is also reported. When it comes to the hard resin such as polystyrene and polyacetal, a molded article composed of a composition of such a resin shows bad releasability from a mold, so that improvement in processability is required. These molded resin articles have a poor sliding property, and improvement of the sliding property is required from the viewpoint of productivity and the feel of the molded article itself.

In order to solve these problems, silicone oil has been added to the thermoplastic resin, which oil is a lubricant and releasing agent excellent in chemical and physical stability. However, most of the silicone oil in the vicinity of the surface of the molded article seeps out in a short time and is lost. Accordingly, the sliding property is not sufficiently maintained in a long time, though an excellent sliding property is attained in an early stage. In addition, the surface of the molded article is sticky to damage its commercial value, which is another problem.

To solve this problem, some methods were proposed wherein perfectly spherical silicone powder is incorporated (see, for example, JP-A-H1-18408, JP-A-H1-204950, and JP-B-H7-39214), silicone rubber and polytetrafluoroethylene powder are incorporated (see JP-A-H4-234450), a silicone oil and polyvinylidene fluoride powder are incorporated (see JP-A-H4-264152), or a UV curable resin in which spherical silica fine particles are incorporated (see JP-A-H7-102186). Although these methods of incorporating the powder or the spherical fine particles are effective, but still unsatisfactory. The amount of the powder or the spherical fine particles is relatively so large as 2% by mass or more, which is unsuitable for molded article requiring transparency, such as a film, and which is also economically disadvantageous. The solid lubricant causes powder due to abrasion, so that the sliding property deteriorates gradually.

Another method was proposed to obtain a slippery film or other molded article by incorporating an acrylic resin obtained by copolymerization with a silicone-based macromonomer (graft copolymer) into a thermoplastic resin (JP-A-H1-214475, JP-A-H4-173869, JP-A-H6-100746). The silicone-grafted acrylic resin is well compatible with a vinyl resin and, accordingly, well dispersed. As a result, a small amount of the silicone-grafted acrylic resin is insufficient to attain the desired effect. Further, because the silicone-grafted acrylic resin itself is powder having an irregular shape so as to tend to cause friction on the surface of the molded article, which is disadvantageous.

PRIOR LITERATURES

[Patent Literature 1] Japanese Patent Application Laid-Open No. Hei 1(1989)-18408
[Patent Literature 2] Japanese Patent Application Laid-Open No. Hei 1(1989)-204950
[Patent Literature 3] Japanese Examined Patent Publication No. Hei 7(1995)-39214
[Patent Literature 4] Japanese Patent Application Laid-Open No. Hei 4(1992)-234450
[Patent Literature 5] Japanese Patent Application Laid-Open No. Hei 4(1992)-264152
[Patent Literature 6] Japanese Patent Application Laid-Open No. Hei 7(1995)-102186
[Patent Literature 7] Japanese Patent Application Laid-Open No. Hei 1(1989)-214475
[Patent Literature 8] Japanese Patent Application Laid-Open No. Hei 4(1992)-173869
[Patent Literature 9] Japanese Patent Application Laid-Open No. Hei 6(1994)-100746

SUMMARY OF THE INVENTION

Problems to be Solved by the Invention

Accordingly, a thermoplastic resin composition is needed, which provide a molded article having a small dynamic friction coefficient, a good sliding property, and an excellent anti-blocking property.

Under the aforesaid circumstances, an object of the present invention is to provide a thermoplastic resin composition, which provides a molded article having an excellent mold-releasability, and excellent abrasion resistance, and such a molded article.

Means to Solve the Problems

As a result of extensive researches to attain the aforesaid purpose, the present inventors have found that a thermoplastic resin composition comprising a silicone-acryl core-shell resin having a specific structure provides a molded article which has excellent mold-releasability, and excellent abrasion resistance to solve the aforesaid problem. Thus, the present invention has been completed.

The present invention provides a thermoplastic resin composition comprising 80 to 99.9 parts by mass of a thermoplastic resin (I), and 0.1 to 20 parts by mass of a silicone-acryl core-shell resin (II), a total mass of the thermoplastic resin (I) and the silicone-acryl core-shell resin (II) being 100 parts by mass, wherein a core particle of the silicone-acryl core-shell resin (II) is composed of an organopolysiloxane (A), and a shell layer of the silicone-acryl core-shell resin (II) is composed of a poly (meth) acrylate ester (B), a mass ratio of the organopolysiloxane (A) to the poly (meth) acrylate ester (B) is in a range of 40:60 to 90:10, and a length (β) of the part of a circumference occupied by the poly (meth) acrylate ester in the silicone-acryl core-shell resin (II) accounts for at least 90% of a whole circumferential length (α) of the silicone-acryl core-shell resin (II). Further, the present invention provides a molded resin article, particularly a film or sheet, composed of the thermoplastic resin composition.

Effects of the Invention

The thermoplastic resin composition of the present invention provides a molded resin article which has a small dynamic friction coefficient, a good sliding property, excellent abrasion resistance, and excellent mold-releasability. Therefore, thermoplastic resin composition of the present invention offers excellent production efficiency in the production of molded articles and, further, less environmental burden on account of needlessness of a coupling agent.

BEST MODE OF THE INVENTION

EMBODIMENTS FOR PRACTICING THE INVENTION

Figure 1:
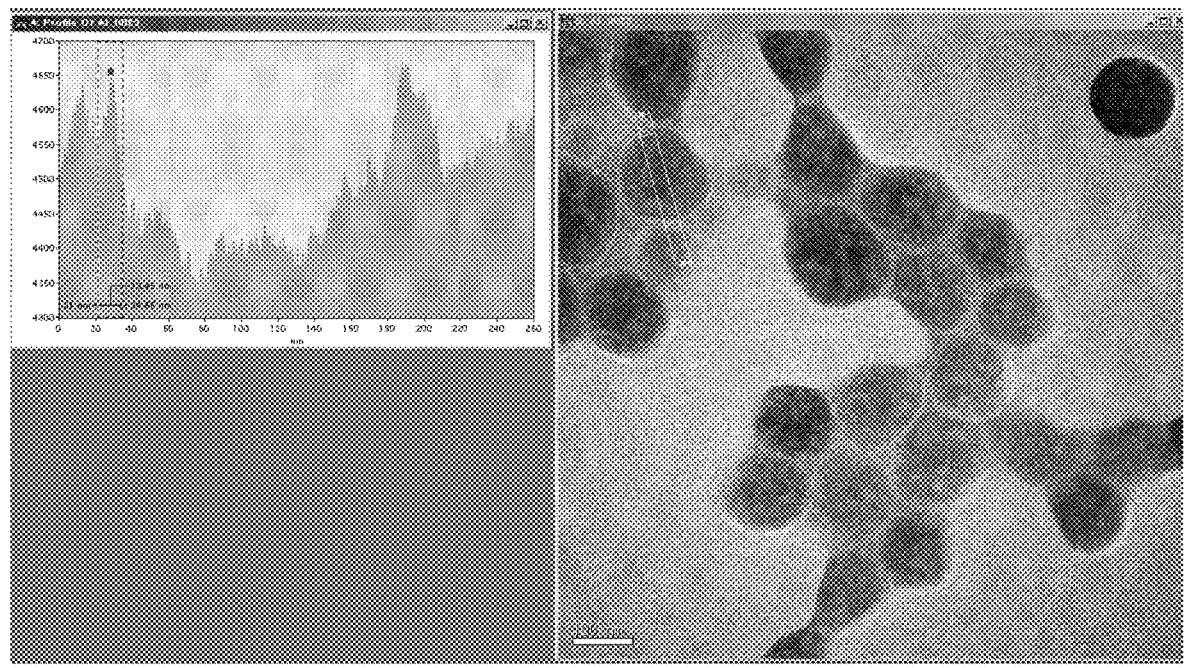
FIG. 1 shows a transmission electron microscope (TEM) image of the silicone-acryl core-shell resin obtained in Example 1 and graphical data to determine a thickness of the shell layer.

The present invention is a thermoplastic resin composition comprising
80 to 99.9 parts by mass of a thermoplastic resin (I), and 0.1 to 20 parts by mass of a silicone-acryl core-shell resin (II), a total mass of the thermoplastic resin (I) and the silicone-acryl core-shell resin (II) being 100 parts by mass, wherein a core particle of the silicone-acryl core-shell resin (TT) is composed of an organopolysiloxane (A), and shell layer of the silicone-acryl core-shell resin (II) is composed of a poly (meth) acrylate ester (B), a mass ratio of the organopolysiloxane (A) to the poly (meth) acrylate ester (B) is in a range of 40:60 to 90:10, and a length 0) of the part of a circumference occupied by the poly (meth) acrylate ester in the silicone-acryl core-shell resin (II) accounts for at least 90% of a whole circumferential length (α) of the silicone-acryl core-shell resin (II).

Each component will be explained below in detail.

The thermoplastic resin (I) may be any known one, preferably urethane resins, vinyl chloride resins, acrylic resins, styrene-butadiene-acrylonitrile resins, polyester resins, amide resins, acetal resins, or polycarbonate resins. Here, the thermoplastic resin preferably has a Shore A hardness of 80 or more, and preferably 95 or less. In the present specification, Shore A hardness is determined according to JISK7215.

The amount of the thermoplastic resin (I) is 80 to 99.9 parts by mass, preferably 90 to 95 parts by mass, and the amount of the silicone-acryl core-shell resin (II) is 0.1 to 20 parts by mass, preferably 5 to 10 parts by mass, wherein the total mass of the thermoplastic resin (1) and the silicone-acryl core-shell resin (II) is 100 parts by mass. Further, the amount of the thermoplastic resin is 80 to 99.9% by mass, preferably 90 to 95% by mass, based on the total amount of the resin composition. If the amount of the thermoplastic resin (I) is less than the lower limit, abrasion resistance of a molded resin article, particularly, abrasion resistance of a film, is worse. If it exceeds the upper limit, a surface of a molded resin article is not smooth and gives a bad feeling in touch.

In the silicone-acryl core-shell resin (II), a core is composed of an organopolysiloxane (A), and a shell layer is composed of a poly (meth) acrylate ester (B). A mass ratio of the component (A) to the component (B), (A):(B), is 40:60 to 90:10, preferably 50:50 to 85:15.

In the silicone-acryl core-shell resin in the present invention, a length (p) of the part of a circumference occupied by the poly (meth) acrylate ester accounts for at least 90%, preferably at least 93%, more preferably at least 95%, of a whole circumferential length (α) of the silicone-acryl core-shell resin, whereby the silicone-acryl core-shell resin may disperse well in the matrix thermoplastic resin.

In the present invention, a covering ratio (Z) is defined by the following formula.

Covering ratio $(Z)=[(\beta)/(\alpha)]\times 100$

Here, α and β are determined, using TEM images. A diameter of a core-shell particle is measured on a TEM image of a core-shell particle, from which a theoretical circumferential length (α) is calculated. In TEM images, a dark part of the particle is occupied by the organopolysiloxane, and a grey part is occupied by the poly (meth) acrylate ester. If a dark part is seen on the circumference of the particle, this means that this part of the circumference is not covered by the poly (meth) acrylate ester. A length (L) of the dark part, if any, on the circumference of the particle is measured. Then, $\beta=\alpha-L$.

When the entire core particle is covered with poly (meth) acrylate ester, the value of L is 0 and the covering ratio (Z) is 100%.

Figure 2:
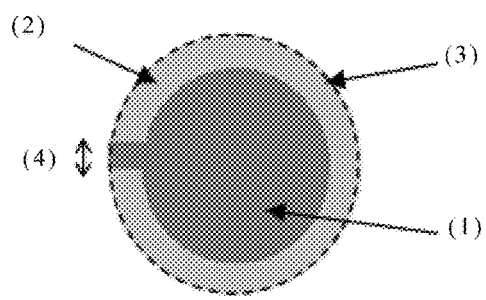
FIG. 2 is a schematic depiction on a silicone-acryl core-shell resin of the present invention.

In FIG. 2, (1) indicates the core composed of the organopolysiloxane; (2) indicates the shell composed of the poly (meth) acrylate ester; (3) indicates the whole circumferential length (α); and (4) indicates a length of a dark part on the circumference, occupied by the organopolysiloxane.

The silicone-acryl core-shell resin (II) is prepared preferably by core-shell polymerization, i.e., reacting a (meth) acrylate ester monomer (b) and, if necessary, a functional group-containing monomer (c) copolymerizable with a (meth) acrylate ester monomer (b), on a core composed of an organopolysiloxane (a) represented by the following general formula (1).

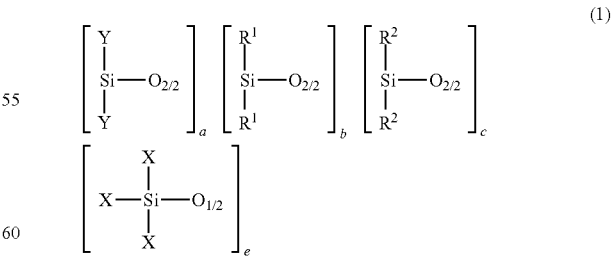

In formula (1), $R^1$ is, independently of each other, a substituted or unsubstituted, monovalent hydrocarbon group having 1 to 20 carbon atoms, other than an aryl group, and $R^2$ is a phenyl group, X is, independently of each other, a substituted or unsubstituted, monovalent hydrocarbon group having 1 to 20 carbon atoms, an alkoxy group having 1 to 20 carbon atoms, or a hydroxy group, and Y is, independently of each other, a group defined for X, or a group represented by —[O—Si(X)$_2$]$_d$—X, provided that at least one of the groups represented by X and Y is a hydroxyl group, wherein a is the number of 0 or more, $0.3 \leq b/(a+b+c+e) \leq 1$, $0 \leq c/(a+b+c+e) \leq 0.6$, $0 \leq e/(a+b+c+e) \leq 0.1$, and d is the number of 0 to 10.

$R^1$ is a substituted or unsubstituted, monovalent hydrocarbon group having 1 to 20 carbon atoms other than an aryl group, such as alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl, and cycloheptyl groups. The substituted monovalent hydrocarbon group include alkyl groups substituted with a halogen atom, an acryloxy group, a methacryloxy group, a carboxy group, an alkoxy group, an alkenyloxy group, an amino group, or a (meta)acryloxy-substituted amino group. $R^1$ is preferably a methyl group.

X is, independently of each other, a substituted or unsubstituted alkyl group having 1 to 20 carbon atoms, an aryl group having 6 to 20 carbon atoms, an alkoxy group having 1 to 20 carbon atoms or a hydroxy group. Examples of X include a hydroxy group, a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group, a cyclopentyl group, a cyclohexyl group, a cycloheptyl group, a phenyl group, a tolyl group, a naphthyl group, a methoxy group, an ethoxy group, a propoxy group, a butoxy group, a hexyloxy group, a heptyloxy group, an octyloxy group, a decyloxy group, and a tetradecyloxy group. Further, examples of the substituted alkyl group include the same groups as described above.

Y is, independently of each other, a group defined for X, or a group represented by —[O—Si(X)$_2$]$_d$—X, as described above, wherein d is the number of from 0 to 10, preferably from 0 to 5.

A method for preparing the organopolysiloxane (a) represented by formula (1) is not particularly limited. For example, it may be prepared by ring-opening polymerization of a cyclic organosiloxane. Examples of the cyclic organosiloxane include hexamethylcyclotrisiloxanel (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra [3-(p-vinylphenyl)propyl] tetramethylcyclotetrasiloxane, 1,3,5,7-tetra(N-acryloyl-N-methyl-3-aminopropyl)tetramethylcyclotetrasiloxane, and 1,3,5,7-tetra(N,N-bis(lauroyl)-3-aminopropyl)tetramethylcyclotetrasiloxane.

A catalyst for polymerization of the cyclic organosiloxane is preferably a strong acid, such as hydrochloric acid, sulfuric acid, dodecylbenzenesulfonic acid, citric acid, lactic acid, and ascorbic acid. Dodecylbenzenesulfonic acid which has an emulsifying ability is preferred.

In the ring-opening emulsion polymerization, a surfactant is preferably used, such as anionic surfactants, for instance, sodium lauryl sulfate, sodium laureth sulfate, N-acylamino acid salt, N-acyltaurine salt, aliphatic soap, and alkyl phosphate. Among them, those which are easily soluble in water and do not have a polyethylene oxide chain are preferred, more preferably, N-acylamino acid salts, N-acyltaurine salts, aliphatic soaps and alkyl phosphates, particularly preferably, sodium lauroylmethyltaurine and sodium myristoylmethyltaurine. Emulsion particles composed of the organopolysiloxane represented by formula (1) are obtained in the ring-opening emulsion polymerization in the presence of a surfactant.

A temperature in the ring-opening emulsion polymerization of the cyclic organosiloxane is preferably 50 to 75 degrees C. A polymerization time is preferably 10 hours or more, more preferably 15 hours or more. The reaction mixture is preferably aged at 5 to 30 degrees C. for 10 hours or more after the polymerization.

The (meth) acrylate ester (b) (hereinafter sometimes referred to as acrylic component) in the present invention refers to an acrylate ester monomer or methacrylate ester monomer having no functional group such as a hydroxy group, an amide group, or a carboxy group, preferably an acrylic acid alkyl ester or alkyl methacrylate ester having an alkyl group having 1 to 10 carbon atoms. A polymer of the acryl monomer preferably has a glass transition temperature (hereinafter, sometimes referred to as Tg) of 40 degrees C. or higher, more preferably 60 degrees C. or higher. Examples of such a monomer include methyl methacrylate, isopropyl methacrylate, ethyl methacrylate, cyclohexyl methacrylate, and butyl acrylate. The upper limit of Tg is preferably 200 degrees C. or lower, more preferably 150 degrees C. or lower. The glass transition temperature is determined according to the Japan Industrial Standards (JIS) K7121.

The functional group-containing monomer (c) copolymerizable with the (meth) acrylate ester (b) may be a monomer having a carboxy group, an amide group or a hydroxy group, and an unsaturated bond such as a vinyl group, or an allyl group. Examples thereof include methacrylic acid, acrylic acid, acrylamide, allyl methacrylate, vinyl methacrylate, 2-hydroxyethyl methacrylate, and 2-hydroxypropyl methacrylate. These comonomers improve compatibility between the core-shell resin and the thermoplastic resin. Methacrylic acid, acrylic acid, and 2-hydroxyethyl methacrylate are particularly preferred.

In the preparation of the silicone-acryl core-shell resin, an amount of the (meth) acrylic acid ester (b) is preferably from 10 to 150 parts by mass, more preferably from 20 to 100 parts by mass, per 100 parts by mass of the organopolysiloxane (a). If the amount of component (b) is too small, it is difficult to convert the product into a form of powder. If the amount of component (b) is too large, slidability of a molded article is insufficient. Where component (c) is incorporated, an amount thereof is preferably 0.01 to 50 parts by mass, more preferably 0.01 to 20 parts by mass, still more preferably 0.01 to 10 parts by mass, per 100 parts by mass of component (a). If the amount of component (c) is too large, it is necessary to add a large amount of the obtained silicone-acryl core-shell resin to the thermoplastic resin (I) to attain sufficient slidability of a molded article.

in order to prepare the silicone-acryl core-shell resin (II) of the present invention, the (meth) acrylate ester (b) and, if necessary, the functional group-contain monomer (c) copolymerizable therewith is (are) radically polymerized on the particle composed of the polyorganosiloxane (a). Specifically, the (meth) acrylate ester (b) and, if necessary, the functional group-contain monomer (c) copolymerizable therewith is(are) added dropwise to the emulsion of the particles composed of the polyorganosiloxane (a) in a continuous manner or portion-wise in 2 to 10 aliquots in the presence of a radical initiator at a temperatures of 25 to 55 degrees C., in a predetermined period of time of 2 to 8 hours. If the components (b) and (c) are fed in one go, no core-shell particles might not be formed.

Examples of the radical initiator include persulfates such as potassium persulfate and ammonium persulfate, aqueous hydrogen persulfate, butyl hydroperoxide, and hydrogen peroxide. If necessary, use may be made, in the reaction system, of a redox system with a reducing agent, such as sodium hydrogen sulfite, Rongalite, L-ascorbic acid, tartaric acid, saccharides, and amines.

An anionic surfactant may be incorporated in the reaction system to improve stability of the reaction system, such as sodium lauryl sulfate, sodium laureth sulfate, N-acylamino acid salt, N-acyltaurine salt, aliphatic soap, and alkyl phosphate. A nonionic emulsifier may be incorporated, such as polyoxyethylene lauryl ether and polyoxylene tridecyl ether.

A polymerization temperature of component (b) and, if any, (c) is preferably 25 to 55 degrees C., more preferably 25 to 40 degrees C. A polymerization time is preferably 2 to 8 hours, more preferably 3 to 6 hours.

Further, a chain transfer agent may be added to adjust a molecular weight of the polymer.

The silicone-acryl core-shell resin (II) thus obtained comprises a core composed of the polyorganosiloxane (a) and a shell layer composed of the polymer of the component (b) (and component (c)). A length (b) of the part of a circumference occupied by the poly (meth) acrylate ester in the silicone-acryl core-shell resin (II) accounts for at least 90%, preferably at least 95%, of a whole circumferential length (a) of the silicone-acryl core-shell resin (II). More specifically, the poly (meth) acrylate ester is attached to a surface of the polyorganosiloxane core.

A solid content in the silicone-acryl core-shell resin emulsion is preferably 35 to 50% by mass. A viscosity at 25 degrees C. is preferably 500 mPa·s or less, more preferably 50 to 500 mPa·s. The viscosity is determined with a rotary viscometer.

An average particle diameter in the emulsion particles of the silicone-acryl core-shell resin (II) is preferably 50 to 400 nm. The average particle diameter is measured, using a TEM, as will be explained below.

The average particle diameter of the core of the silicone-acryl core-shell resin (II) is preferably 20 to 300 nm, more preferably 50 to 250 nm. The particle diameter of the core is a diameter of a dark central part in an image taken by a TEM.

A thickness of the shell of the silicone-acryl core-shell resin (II) is preferably 1 to 50 nm, more preferably 5 to 30 nm. The thickness of the shell is a half of a difference between the average particle diameter of the core and the average particle diameter of the silicone-acryl core-shell resin (II).

The thermoplastic resin composition may further comprise optional components which will be described below. The amount of the silicone-acryl core-shell resin (II) is 0.1 to 20 parts by mass, preferably 0.5 to 10 parts by mass, per 100 parts by mass of the thermoplastic resin composition. If the amount of the silicone-acryl core-shell resin (II) is less than the lower limit, almost no improvement is observed in releasability of a molded article, If the amount of the silicone-acryl core-shell resin (II) is larger than the upper limit, a molded article is whitened and, further, a sliding property is poor, which are not preferred.

The obtained emulsion of the silicone-acryl core-shell resin (II) is subjected to salting out, drying, preferably spray drying, to obtain powder.

The resulting powder is then dry-blended and kneaded with the thermoplastic resin (I) by, for instance, rolls, a kneader, a Bunbury mixer, a plast mill, or an extruder, and extrusion molded or injection molded into a desired shape. The thermoplastic resin may be made in a form of pellets or powder in advance. A molding temperature may be a melting temperature of the resin composition or higher. Preferably, a set temperature is 180 to 250 degrees C. For example, pellets are obtained through a strand die of a twin-screw extruder of a labo plast mill, ex Toyo Seiki Co., Ltd. The pellets are then injection-molded into pieces of 3 cm×3 cm×2 mm by a small injection molding machine (ex Nissei Resin Industries Co., Ltd.) of 80 tf at a temperature of 180 to 250° C. Similarly, the pellets are molded through a T die into a film of about 200 μm by a twin-screw extruder of the labo plast mill. Here, good transparency is required for the molded resin articles. The haze value is preferably at most 85% for both of the molded resin article of the thickness of 2 mm and the molded resin article having a thickness of 200 μm. If it exceeds 85%, no visual transparency is perceived and, for example, a color or a pattern of a substrate may not be seen at all. A thickness of a molded article may be appropriately chosen. For instance, a molded article may have a thickness in a range of 10 μm to 10 mm.

The molded resin article of the present invention may further contain an antioxidant, a colorant, an ultraviolet absorber, a light stabilizer, an antistatic agent, a plasticizer, a flame retardant, and other resins, as long as the properties of the molded article are not adversely affected.

The molded resin article of the present invention is not particularly limited and may be stationery, toys, home appliances, car sheets, furniture, clothing, shoes, luggage, sanitary goods, and outdoor tents.

EXAMPLES

The present invention will be explained below in further detail with reference to a series of the Examples and the Comparative Examples. However, the present invention is in no way limited by these Examples. In the following Examples, part and percentage represent par by mass and percentage by mass, respectively.

Preparation of Silicone-Acryl Core-Shell Resin (II)

Preparation Example 1

600 Grams of octamethylcyclotetrasiloxane and a solution of 6 g of sodium lauryl sulfate in 54 g of pure water, and a solution of 6 g of dodecylbenzene sulfonate in 54 g of pure water were placed in a 2-liter (hereinafter, abbreviated as "2 L") beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 44.8% after dried at 105 degrees C. for 3 hours. The organopolysiloxane was in a state of a non-flowable soft gel. The structure of the organopolysiloxane in the emulsion was as follows:

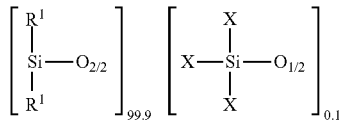

wherein two of X are a methyl group, one of X is a hydroxy group, and $R^1$ is a methyl group.

To the emulsion, 125 g of ion-exchanged water was added and, then, 232 g of methyl methacrylate (MMA) was added dropwise over a period of 3 to 5 hours, while conducting a redox reaction in the presence of a peroxide and a reducing agent at 30 degrees C. to form a polymethyl methacrylate (PMMA) shell layer on a surface of the silicone emulsion particles, so that an emulsion having a solid content of 45.2% was obtained. This was spray-dried to remove volatiles up to a volatile content of 1.2% to obtain powder of the silicone-acryl core-shell resin. The solid content was determined as will be explained below.

Preparation Example 2

600 Grams of octamethylcyclotetrasiloxane and a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 44.8% after dried at 105 degrees C. for 3 hours, and the organopolysiloxane was in a state of a non-flowable soft gel. The structure of the organopolysiloxane in the emulsion was as follows:

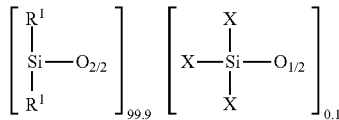

wherein two of X are a methyl group, one of X is a hydroxy group, and $R^1$ is a methyl group.

To the emulsion, 50 g of ion-exchanged water was added and, then, 95 g of methyl methacrylate (MMA) was added dropwise over a period of 3 to 5 hours, while conducting a redox reaction in the presence of a peroxide and a reducing agent at 30 degrees C. to form a polymethyl methacrylate (PMMA) shell layer on a surface of the silicone emulsion particles, so that an emulsion having a solid content of 45.0% was obtained. This was spray-dried to remove volatiles up to a volatile content of 1.1% to obtain powder of the silicone-acryl core-shell resin. The solid content was determined as will be explained below.

Preparation Example 3

600 Grams of octamethylcyclotetrasiloxane and a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 44.8% after dried at 105 degrees C. for 3 hours, and the organopolysiloxane was in a state of a non-flowable soft gel.

The structure of the organopolysiloxane in the emulsion was as follows:

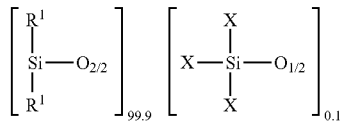

wherein two of X are a methyl group, one of X is a hydroxy group, and $R^1$ is a methyl group.

To the emulsion, 442 g of ion-exchanged water was added and, then, 807 g of methyl methacrylate (MMA) was added dropwise over a period of 3 to 5 hours, while conducting a redox reaction in the presence of a peroxide and a reducing agent at 30 degrees C. to form a polymethyl methacrylate (PMMA) shell layer on a surface of the silicone emulsion particles, so that an emulsion having a solid content of 45.3% was obtained. This was spray-dried to remove volatiles up to a volatile content of 1.2% to obtain powder of the silicone-acryl core-shell resin. The solid content was determined as will be explained below.

Preparation Example 4

300 Grams of octamethylcyclotetrasiloxane, 300 g of diphenyldimethylsiloxane (KF-54, ex Shin-Etsu Chemical Industry Co., Ltd.), a solution of 24 g of 50% sodium alkyl diphenyl ether disulfonate (PELEX SS-L, ex Kao Co., Ltd.) in 45 g of pure water, and a solution of 6 g of dodecylbenzene sulfonate in 54 g of pure water were placed in a 2 L beaker made of polyethylene, and uniformly emulsified by a homomixer, which was then diluted by adding 490 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 55 degrees C. for 10 to 20 hours, followed by aging at 10 degrees C. for 10 to 20 hours and neutralization to an almost neutral point with 12 g of a 10% aqueous solution of sodium carbonate to obtain an emulsion. The emulsion had a non-volatile content (solid content) of 47.5% after dried at 105 degrees C. for 3 hours, and the organopolysiloxane was in a state of a non-flowable soft gel.

The structure of the organopolysiloxane in the emulsion was as follows:

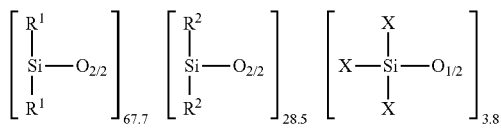

wherein two of X are a methyl group, one of X is a hydroxy group, $R^1$ is a methyl group and $R^2$ is a phenyl group.

To the emulsion, 167 g of ion-exchanged water was added and, then, 249 g of methyl methacrylate (MMA) was added dropwise over a period of 3 to 5 hours, while conducting a redox reaction in the presence of a peroxide and a reducing agent at 30 degrees C. to form a polymethyl methacrylate (PMMA) shell layer on a surface of the silicone emulsion particles, so that an emulsion having a solid content of 45.6% was obtained. This was spray-dried to remove volatiles up to a volatile content of 1.0% to obtain powder of the silicone-acryl core-shell resin. The solid content was determined as will be explained below.

Preparation Example 5

600 Grams of octamethylcyclotetrasiloxane, 1 g of hexamethyldisiloxane (M2), a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 45.4% after dried at 105 degrees C. for 3 hours, and the organopolysiloxane was in a state of a non-flowable soft gel.

The structure of the organopolysiloxane in the emulsion was as follows:

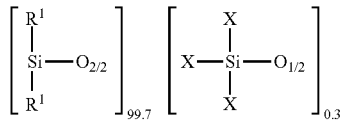

wherein $R^1$ is a methyl group, and all of X are a methyl group.

To the emulsion, 133 g of ion-exchanged water was added and, then, 160 g of methyl methacrylate (MMA) and 74 g of butyl acrylate (BA) were added dropwise over a period of 3 to 5 hours, while conducting a redox reaction in the presence of a peroxide and a reducing agent at 30 degrees C. to form a polymethyl methacrylate (PMMA) shell layer on a surface of the silicone emulsion particles, so that an emulsion having a solid content of 44.9% was obtained. This was spray-dried to remove volatiles up to a volatile content of 1.2% to obtain powder of the silicone-acryl core-shell resin.

Comparative Preparation Example 1

600 Grams of octamethylcyclotetrasiloxane and a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 44.8% after dried at 105 degrees C. for 3 hours, and the organopolysiloxane was in a state of a non-flowable soft gel.

The structure of the organopolysiloxane in the emulsion was as follows:

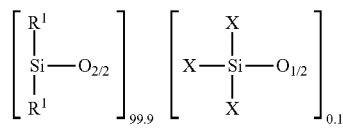

wherein two of X are a methyl group, one of X is a hydroxy group, and $R^1$ is a methyl group.

To the emulsion, 125 g of ion-exchanged water was added and, then, 232 g of methyl methacrylate (MMA) was added in one go and stirred for 1 hour, followed by a redox reaction by adding dropwise a peroxide and a reducing agent at 30 degrees C. over a period of 3 to 5 hours. A shell layer was not sufficiently formed and most of methyl methacrylate (MMA) came into cores. That is, polymethyl methacrylate (PMMA) was brought in emulsion particles in the obtained emulsion having a solid content of 45.4%. A covering ratio of the emulsion particles was 20%, as determined as will be described below. The emulsion was spray-dried to remove volatiles up to a volatile content of 1.2% to obtain powder of the silicone-acryl core-shell resin (provisionally called so).

Comparative Preparation Example 2

600 Grams of octamethylcyclotetrasiloxane and a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 44.8% after dried at 105 degrees C. for 3 hours, and the organopolysiloxane in the emulsion was in a state of a non-flowable soft gel.

The structure of the organopolysiloxane in the emulsion was as follows:

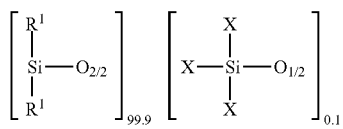

wherein two of X are a methyl group, one of X is a hydroxy group, and R¹ is a methyl group.

To the emulsion, 689 g of ion-exchanged water was added and, then, 1256 g of methyl methacrylate (MMA) was added dropwise over a period of 3 to 5 hours, while conducting a redox reaction in the presence of a peroxide and a reducing agent at 30 degrees C. to form a polymethyl methacrylate (PMMA) shell layer on a surface of the silicone emulsion particles, so that an emulsion having a solid content of 45.2% was obtained. This was spray-dried to remove volatiles up to a volatile content of 1.2% to obtain powder of the silicone-acryl core-shell resin.

The solid content was determined as will be explained below.

Comparative Preparation Example 3

600 Grams of octamethylcyclotetrasiloxane and a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 44.8% after dried at 105 degrees C. for 3 hours, and the organopolysiloxane in the emulsion was in a state of a non-flowable soft gel.

The structure of the organopolysiloxane in the emulsion was as follows.

The emulsion particles did not have a shell layer on the surface and the organopolysiloxane was in a state of a non-flowable soft gel. Accordingly, it was impossible to convert them into powder by spray drying.

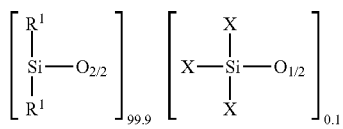

wherein two of X are a methyl group, one of X is a hydroxy group, and R¹ is a methyl group.

Comparative Preparation Example 4

In Comparative Preparation Example 4, a conventional silane coupling agent (3-methacryloxypropylmethyldimethoxysilane, KBM-502, ex Shin-Etsu Chemical Industry Co., Ltd.) was further fed. An organopolysiloxane having f units having a methacryloxypropyl group, which is represented by the following formula (1'), and methyl methacrylate were subjected to emulsion graft polymerization.

599.4 Grams of octamethylcyclotetrasiloxane, 0.6 g of KBM-502, a solution of 6 g of sodium lauryl sulfate in 54 g of pure water, and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 50 to 60 degrees C. for 24 hours, followed by aging at 10 to 20 degrees C. for 24 hours and neutralization to an almost neutral point with 12 g of a 10% aqueous solution of sodium carbonate to obtain an emulsion. The emulsion had a non-volatile content (solid content) of 45.3% after dried at 105 degrees C. for 3 hours, and the organopolysiloxane in the emulsion was in a state of a non-flowable soft gel.

The structure of the organopolysiloxane in the emulsion was as follows:

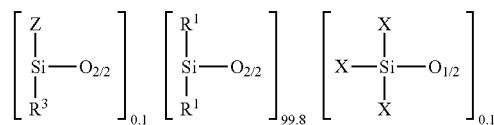

wherein two of X are a methyl group, one of X is a hydroxy group, R¹ is a methyl group, R³ is a methacryloxypropyl group, and Z is a methyl group.

To the emulsion, 125 g of ion-exchanged water was added and, then, 232 g of methyl methacrylate (MMA) was added dropwise over a period of 3 to 5 hours, while conducting a redox reaction in the presence of a peroxide and a reducing agent at 30 degrees C. to form a polymethyl methacrylate (PMMA) shell layer on a surface of the silicone emulsion particles, so that an emulsion having a solid content of 45.1% was obtained. This was spray-dried to remove volatiles up to a volatile content of 1.2% to obtain powder of the silicone-acryl core-shell resin. The solid content was determined as will be explained below.

Determination of a Covering Ratio

A covering ratio was calculated as described above. The used TEM was JEM-2100™, ex JEOL Ltd. A covering ratio (Z) is defined by the following formula.

$$\text{Covering ratio }(Z)=[(\beta)/(c)]\times 100$$

Here, α and β are determined, using TEM images. A diameter of a core-shell particle was measured on a TEM image of a core-shell particle, from which a theoretical circumferential length (α) was calculated. A length (L) of the dark part on the circumference of the particle was measured. Then, β=α–L.

When the entire core particle is covered with poly (meth) acrylate ester, the value of L is 0 and the covering ratio (Z) is 100%.

The length of at least ten particles on the TEM image were measured and adopted to obtain an average.

Determination of a Solid Content

Approximately 1 g of each of the silicone-acryl core-shell resin (sample) obtained in the Examples and the Comparative Examples was placed in an aluminum foil dish having dimensions of 70φ×12 h in mm and accurately weighed, placed in a dryer kept at about 105 degrees C., left for 1 hour, then taken out from the dryer, allowed to cool in a desiccator, and weighed. A solid content was calculated by the following formula.

$$R = \frac{T-L}{W-L} \times 100$$

R: Solid content in %
W: Mass in gram of the aluminum foil dish and the undried sample
L: Mass in gram of the aluminum foil dish
T: Mass in gram of the aluminum foil dish and the dried sample Determination of an Average Particle Diameter of the Silicone-Acryl Core-Shell Resin A diameter of a particle was measured, as mentioned above, on an image taken by a TEM, JEM-2100™, ex JEOL Ltd.

Determination of a Shell Thickness

The silicone-acryl core-shell resin emulsion was diluted 5000 times, applied on a grid, and dried at room temperature, whose image was then taken by a TEM, JEM-2100™, ex JEOL Ltd. The thickness of the shell is a half of a difference between the average particle diameter of the core and the average particle diameter of the silicone-acryl core-shell resin particle. The determination of at least ten particles (N=10) on the TEM image were conducted and adopted to obtain an average.

FIG. 1 shows the TEM image of the silicone-acryl core-shell resin of Example 1. The data is one of ten times determination (N=10). The thickness of the shell layer there is 13.5 nm. The average value of N=10 is 15 nm.

The compositions in part by mass and the physical properties of the organopolysiloxanes contained in the emulsions are summarized in the following Table 1. The pH shown in the Table was a pH of the dispersion medium in the emulsion at 25 degrees C. The weight average molecular weight, Mw, was determined by gel permeation chromatography (GPC) with THF as a solvent at 25 degrees C., and reduced to polystyrene.

TABLE 1

| | | Preparation Example | | | | | Comp. Preparation Example | | | |
|---|---|---|---|---|---|---|---|---|---|---|
| | | 1 | 2 | 3 | 4 | 5 | 1 | 2 | 3 | 4 |
| Composition | D4× | 100 | 100 | 100 | 50 | 100 | 100 | 100 | 100 | 99.9 |
| | KE-54× | 0 | 0 | 0 | 50 | 0 | 0 | 0 | 0 | 0 |
| | M2 | | | | | 0.17 | | | | |
| | Silane Coupling Agent, KBM-502 | 0 | 0 | 0 | 0 | 0 | 0 | 0 | 0 | 0.1 |
| | Solid Content, % | 44.8 | 44.8 | 44.8 | 47.5 | 45.4 | 44.8 | 44.8 | 44.8 | 45.3 |
| | pH | 6.9 | 6.9 | 6.9 | 6.8 | 7.1 | 6.9 | 6.9 | 7.1 | 6.9 |
| | Mw, GPC | 250,000 | 250,000 | 250,000 | 8,000 | 110,000 | 250,000 | 250,000 | 250,000 | 250,000 |

×D4 is octamethylcyclotetrasiloxane, KF-54 is diphenyldimethylsiloxane, and M2 is hexamethyldisiloxane.

The compositions in part by mass and the properties of the silicone-acryl core-shell resins were as shown in Table 2 below.

TABLE 2

| | Preparation Example | | | | | Comp. Preparation Example | | | |
|---|---|---|---|---|---|---|---|---|---|
| | 1 | 2 | 3 | 4 | 5 | 1 | 2 | 3 | 4 |
| Organopolysiloxane | 70 | 85 | 40 | 70 | 70 | 70 | 20 | — | 70 |
| Methyl methacrylate | 30 | 15 | 60 | 30 | 20 | 30 | 80 | | 30 |
| Butyl acrylate | | | | | 10 | | | | |
| Covering ratio | 100 | 100 | 100 | 100 | 100 | 20 | 100 | | 100 |
| Solid content, % | 45.2 | 45 | 45.3 | 45.6 | 44.9 | 45.5 | 45.2 | | 45.1 |
| Av. particle diameter, nm | 152 | 144 | 187 | 240 | 166 | 589 | 225 | | 148 |
| Thickness of the shell, nm | 15 | 10 | 25 | 13 | 15 | Not observed | 30 | | 14 |
| Core diameter, nm | 122 | 124 | 137 | 214 | 136 | | 165 | | 120 |

Preparation and Evaluation of the Thermoplastic Resin Compositions

Examples 1-7, Comparative Examples 1-4 and Reference Example 5

The thermoplastic urethane resin and the silicone-acryl core-shell resin powder obtained in the aforesaid Preparation Example or the Comparative Preparation Example were mixed in the amounts described in Table 3 or 4 below by a labo plastomil (ex Toyo Seiki Co., Ltd.) having a strand die and extruded into pellets at a temperature of 200 degrees C. The pellets were heated and molded by a small injection molding machine having a mold of 2 cm×2 cm×2 mm to obtain a molded resin article.

The thermoplastic urethane resins used in the Examples, the Comparative Examples and the Reference Example are as follows.

Elastollan ET-597-10

Thermoplastic polyurethane (polyester type), Shore A hardness of 97, ex BASF

Miractran XN-2000

Thermoplastic polyurethane (polycarbonate type), Shore A hardness of 85, ex Tosoh Co.

Releasability

At an end of a molding step, the mold was cooled to a temperature of 60 degrees C., and the molded article was removed from the mold by being pushed by ejector pins. The ejection pins were installed in the mold. This molding-ejection process was carried out 10 times. A ratio of the number of successful ejections per 10 molding-ejection trials indicates releasability, expressed in %" in Tables 3 and 4. For instance, if ejection was successful 8 times, the releasability is 80%. If ejection was successful 10 times, releasability is 100%.

TABLE 3

| | | Example | | | | | | |
|---|---|---|---|---|---|---|---|---|
| | | 1 | 2 | 3 | 4 | 5 | 6 | 7 |
| Urethane resin | Elastollan ET-597-10 | 99.5 | 95 | 99.5 | 99.5 | 99.5 | 99.5 | |
| | Miractran XN-2000 | | | | | | | 99.5 |
| Silicone-acryl core-shell resin | Preparation Ex. 1 | 0.5 | 5 | | | | | 0.5 |
| | Preparation Ex. 2 | | | 0.5 | | | | |
| | Preparation Ex. 3 | | | | 0.5 | | | |
| | Preparation Ex. 4 | | | | | 0.5 | | |
| | Preparation Ex. 5 | | | | | | 0.5 | |
| | Comparative Preparation Ex. 1 | | | | | | | |
| | Comparative Preparation Ex. 2 | | | | | | | |
| | Comparative Preparation Ex. 4 | | | | | | | |
| Releasability, % | | 100 | 100 | 100 | 100 | 100 | 100 | 100 |

TABLE 4

| | | Comparative Example | | | | Ref. Example |
|---|---|---|---|---|---|---|
| | | 1 | 2 | 3 | 4 | 5 |
| Urethane resin | Elastollan ET-597-10 | 100 | | 99.5 | 99.5 | 99.5 |
| | Miractran XN-2000 | | 100 | | | |
| Silicone-acryl core-shell resin | Preparation Ex. 1 | | | | | |
| | Preparation Ex. 2 | | | | | |
| | Preparation Ex. 3 | | | | | |
| | Preparation Ex. 4 | | | | | |
| | Preparation Ex. 5 | | | | | |
| | Comparative Preparation Ex. 1 | | | 0.5 | | |
| | Comparative Preparation Ex. 2 | | | | 0.5 | |
| | Comparative Preparation Ex. 4 | | | | | 0.5 |
| Releasability, % | | 40 | 0 | 60 | 20 | 100 |

As seen in Table 4, the inferior moldability was observed in the molded article obtained from the thermoplastic resin composition comprising the silicone-acryl core-shell resin of Comparative Preparation Example 2, which silicone-acryl core-shell resin does not satisfy the required mass ratio (Comparative Example 4). Also, the inferior moldability was observed in the molded article obtained from the thermoplastic resin composition comprising the silicone-acryl core-shell resin of Comparative Preparation Example 1, which silicone-acryl core-shell resin has a too small covering ratio (Comparative Example 3).

In contrast, all of the molded articles obtained from the thermoplastic resin compositions of the present invention show the excellent releasability (Examples 1 to 7). The molded articles obtained from the thermoplastic resin composition of the present invention do not comprise a silane coupling agent, but their releasabilities are comparable with that of the molded article obtained from the thermoplastic resin composition comprising the conventional silane coupling agent (Reference Example 5).

Examples 2, 8 to 12, Comparative Examples 6 to 9, and Reference Example 10

The thermoplastic urethane resin and the silicone-acryl core-shell resin powder obtained in the aforesaid Preparation Example or the Comparative Preparation Example were mixed in the amounts described in Table 5 or 6 below by a labo plastomil (ex Toyo Seiki Co., Ltd.) having a T die at a temperature of 200 degrees C. and extruded into a film having a thickness of about 200 μm.

The thermoplastic urethanes used were Elastollan ET-597-10 and Miractran XN-2000 described above.

Static/Dynamic Friction Coefficient

A friction force was determined using HEIDON TYPE-R (ex. Shin-To Scientific Co. Ltd.), where a metal depresser of 200 g weight was brought into vertical contact with the film and moved at a speed of 3 cm/min to determine a friction force. A friction coefficient was calculated from the friction force in a conventional manner.

The results are as seen in Table 5 and 6.

TABLE 5

| | | Example | | | | | |
|---|---|---|---|---|---|---|---|
| | | 2 | 8 | 9 | 10 | 11 | 12 |
| Urethane resin | Elastollan ET-597-10 | 95 | 95 | 95 | 95 | 95 | |
| | Miractran XN-2000 | | | | | | 95 |
| Silicone-acryl core-shell resin | Preparation Ex. 1 | 5 | | | | | 5 |
| | Preparation Ex. 2 | | 5 | | | | |
| | Preparation Ex. 3 | | | 5 | | | |
| | Preparation Ex. 4 | | | | 5 | | |
| | Preparation Ex. 5 | | | | | 5 | |
| | Comparative Preparation Ex. 1 | | | | | | |
| | Comparative Preparation Ex. 2 | | | | | | |
| | Comparative Preparation Ex. 4 | | | | | | |
| Friction Coefficient | Static | 1.23 | 1.15 | 1.48 | 1.45 | 1.2 | 1.95 |
| | Dynamic | 0.68 | 0.54 | 0.69 | 0.78 | 0065 | 1.33 |

TABLE 6

| | | Comparative Example | | | | Ref. Example |
|---|---|---|---|---|---|---|
| | | 6 | 7 | 8 | 9 | 10 |
| Urethane resin | Elastollan ET-597-10 | 100 | | 95 | 95 | 95 |
| | Miractran XN-2000 | | 100 | | | |
| Silicone-acryl core-shell resin | Preparation Ex. 1 | | | | | |
| | Preparation Ex. 2 | | | | | |
| | Preparation Ex. 3 | | | | | |
| | Preparation Ex. 4 | | | | | |
| | Preparation Ex. 5 | | | | | |
| | Comparative Preparation Ex. 1 | | | 5 | | |
| | Comparative Preparation Ex. 2 | | | | 5 | |
| | Comparative Preparation Ex. 4 | | | | | 5 |
| Friction coefficient | Static | 1.92 | 2.52 | 1.8 | 1.78 | 1.2 |
| | Dynamic | 1.31 | 1.78 | 0.97 | 0.88 | 0.7 |

Examples 13 to 17, Comparative Examples 11 to 13, and Reference Example 14

100 Parts by mass of a polyvinyl chloride resin having a degree of polymerization of 1300 (PVC), 65 parts by mass of a plasticizer (DINE) and a stabilizer were mixed by a labo plastomil (ex Toyo Seiki Co., Ltd.) having a strand die and extruded into pellets (hereinafter referred to as PVC compound). The pellets and one of the silicone-acryl core-shell resin powder prepared in the aforesaid Preparation Examples or the Comparative Preparation Examples were mixed in the amounts described in Table 7 or 8 below by a labo plastomil (ex Toyo Seiki Co., Ltd.) having a T die at a temperature of 140 degrees C. and extruded into a film having a thickness of about 200 µm.

TABLE 7

| | | Example | | | | |
|---|---|---|---|---|---|---|
| | | 13 | 14 | 15 | 16 | 17 |
| Thermoplastic resin | PVC Compound | 95 | 95 | 95 | 95 | 95 |
| Silicone-acryl core-shell resin | Preparation Ex. 1 | 5 | | | | |
| | Preparation Ex. 2 | | 5 | | | |
| | Preparation Ex. 3 | | | 5 | | |
| | Preparation Ex. 4 | | | | 5 | |
| | Preparation Ex. 5 | | | | | 5 |
| | Comparative Preparation Ex. 1 | | | | | |
| | Comparative Preparation Ex. 2 | | | | | |
| | Comparative Preparation Ex. 4 | | | | | |
| Friction coefficient | Static | 0.27 | 0.25 | 0.28 | 0.29 | 0.25 |
| | Dynamic | 0.23 | 0.2 | 0.23 | 0.22 | 0.21 |

TABLE 8

| | | Comparative Example | | | Ref. Example |
|---|---|---|---|---|---|
| | | 11 | 12 | 13 | 14 |
| Thermoplastic resin | PVC Compound | 100 | 95 | 95 | 95 |
| Silicone-acryl core-shell resin | Preparation Ex. 1 | | | | |
| | Preparation Ex. 2 | | | | |
| | Preparation Ex. 3 | | | | |
| | Preparation Ex. 4 | | | | |
| | Preparation Ex. 5 | | | | |
| | Comparative Preparation Ex. 1 | | 5 | | |
| | Comparative Preparation Ex. 2 | | | 5 | |
| | Comparative Preparation Ex. 4 | | | | 5 |
| Friction coefficient | Static | 0.4 | 0.35 | 0.41 | 0.25 |
| | Dynamic | 0.31 | 0.29 | 0.32 | 0.21 |

As seen in Tables 5 and 7, the molded articles obtained from the thermoplastic resin compositions of the present invention have the small friction coefficient and, thus excellent abrasion resistance, compared to the molded articles of the Comparative Examples obtained from the compositions which did not comprise the present silicone-acryl core-shell resin powder (Examples 2 and 8 to 11 vs Comparative Example 6; Example 12 vs Comparative Example 7; and Examples 13 to 17 vs Comparative Example 11). The molded articles obtained from the thermoplastic resin compositions of the present invention do not comprise a silane coupling agent, but their friction coefficients are comparable with that of the molded article obtained from the thermoplastic resin compositions comprising the conventional silane coupling agent (Reference Examples 10 and 14).

The large friction coefficient and, thus, inferior abrasion resistance, was observed in the molded article obtained from the thermoplastic resin composition comprising the silicone-acryl core-shell resin of Comparative Preparation Example 2, which silicone-acryl core-shell resin does not satisfy the required mass ratio (Comparative Examples 9 and 13). Also, the large friction coefficient and, thus, inferior abrasion resistance, was observed in the molded article obtained from the thermoplastic resin composition comprising the silicone-acryl core-shell resin of Comparative Preparation Example 1, which silicone-acryl core-shell resin has a too small covering ratio (Comparative Examples 8 and 12).

DESCRIPTION ON THE SYMBOLS IN FIG. 2

(1): Core particle (organopolysiloxane)
(2): Shell layer (poly(meth)acrylate)
(3): Circumference of the shell layer
(4): Length of the part of the circumference where no shell layer exists.

The invention claimed is:
1. A thermoplastic resin composition comprising 80 to 99.9 parts by mass of a thermoplastic resin (I), and 0.1 to 20 parts by mass of a silicone-acryl core-shell resin (II), a total mass of the thermoplastic resin (I) and the silicone-acryl core-shell resin (II) being 100 parts by mass,
wherein
a core particle of the silicone-acryl core-shell resin (II) consists of an organopolysiloxane (a) consisting of units selected from the four units depicted below represented by the following general formula (1), and a shell layer is composed of a polymer of a (meth) acrylate ester monomer (b),

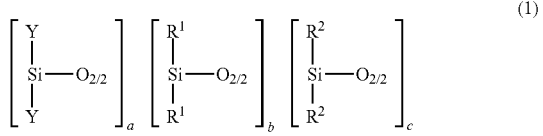

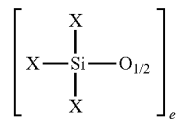

wherein $R^1$ is, independently of each other, an unsubstituted alkyl group having 1 to 20 carbon atoms, other than an aryl group, $R^2$ is a phenyl group, X is, independently of each other, an unsubstituted alkyl group having 1 to 20 carbon atoms, an alkoxy group having 1 to 20 carbon atoms, or a hydroxy group, and Y is a group selected from the groups consisting of a hydroxy group, a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group, a cyclopentyl group, a cyclohexyl group, a cycloheptyl group, a phenyl group, a tolyl group, a naphthyl group, a methoxy group, an ethoxy group, a propoxy group, a butoxy group, a hexyloxy group, a heptyloxy group, an octyloxy group, a decyloxy group, and a tetradecyloxy group, provided that at least one of the groups represented by X is a hydroxyl group and at least one of the groups represented by Y is a hydroxyl group, wherein a is the number of 0 or more, $0.3 \leq b/(a+b+c+e) \leq 1$, $0 \leq c/(a+b+c+e) \leq 0.6$, and $0.001 \leq e/(a+b+c+e) \leq 0.1$, wherein a mass ratio of said organopolysiloxane (a) to said polymer of a (meth) acrylate ester monomer (b) is in a range of 40:60 to 90:10, and a length (β) of the part of a circumference occupied by the polymer of the (meth) acrylate ester monomer (b) in the silicone-acryl core-shell resin (II) accounts for at least 90% of a whole circumferential length (a) of the silicone-acryl core-shell resin (II).

2. The thermoplastic resin composition according to claim 1, wherein the shell layer in the silicone acryl core-shell resin (II) has a thickness of 1nm to 50 nm.

3. The thermoplastic resin composition according to claim 1, wherein the thermoplastic resin (I) is at least one selected from the group consisting of urethane resins, vinyl chloride resins, acrylic resins, styrene-butadiene-acrylonitrile resins, polyester resins, amide resins, acetal resins, and polycarbonate resins.

4. A molded resin article formed by injection- or extrusion-molding, composed of the thermoplastic resin composition according to claim 1.

5. The molded resin article according to claim 4, wherein the molded resin article is a film or sheet.

6. The thermoplastic resin composition according to claim 1, wherein a in the general formula (1) is 0.

* * * * *